3,703,491
ABS RESIN COMPOSITION
Yuzi Takayama, Kamakura, Yutaka Ichimura, Yokohama, Shunsuke Minmmi, Ohtake, and Takanobu Aoyagi and Fumio Takeda, Yokohama, Japan, assignors to Nitto Chemical Industry Co., and Mitsubishi Rayon Co., Ltd., Chuo-ku, Tokyo, Japan
No Drawing. Filed Dec. 11, 1970, Ser. No. 97,331
Claims priority, application Japan, Dec. 12, 1969, 44/99,471
Int. Cl. C08f 15/40
U.S. Cl. 260—23.7 M   5 Claims

ABSTRACT OF THE DISCLOSURE

A thermoplastic resin composition comprising (I) 20 to 70 parts by weight of a copolymer consisting of 20 to 50 parts by weight of a diene type rubbery polymer having a gel content of at least 75% and an average particle diameter of at least $0.2\mu$ and a resinous polymer consisting of 40 to 60 parts by weight of an aromatic vinyl compound and 10 to 30 parts by weight of an unsaturated aliphatic nitrile compound, the proportion of said resinous polymer chemically bonded to the above-mentioned rubbery polymer being 15 to 50 parts by weight per 100 parts by weight of the rubbery polymer, the specific viscosity of the remaining unbonded resinous polymer being 0.5 to 0.9, (II) 30 to 80 parts by weight of a polymer having a specific viscosity of 0.45 to 0.9 which comprises 65 to 85 parts by weight of an aromatic vinyl compound and 35 to 15 parts by weight of an unsaturated aliphatic nitrile compound, (III) 0.1 to 3 parts by weight of a metal salt of a fatty acid and (IV) at least 0.01 part by weight of an organosilicon compound. Said composition is excellent in impact resistance, processability and appearance. When merely subjected to simple melt-extrusion, the composition can give a molded article which is free from such drawbacks as seen in conventional molded articles.

---

This invention relates to a thermoplastic resin composition excellent in impact resistance, processability and appearance which contains a graft copolymer obtained by subjecting a monomer mixture comprising an aromatic vinyl compound and an unsaturated aliphatic nitrile compound to emulsion polymerization in the presence of a diene type rubbery polymer latex and a copolymer obtained by polymerizing a monomer mixture comprising an aromatic vinyl compound and an unsaturated aliphatic nitrile compound.

As to graft polymers (ABS graft polymers) obtained by polymerizing, in the presence of a diene type rubbery polymer, a monomer mixture of an aromatic vinyl compound (hereinafter abbreviated merely to "aromatic vinyl") and an unsaturated aliphatic nitrile compound (hereinafter abbreviated merely to "unsaturated nitrile"), various examinations have been made hitherto and many kinds of such polymers suitable for individual uses have been announced. For the purpose of further improving the properties of ABS graft polymers, various applications have been attempted, and there has been proposed, for example, a process in which a pearl-like (globular) resinous polymer obtained by subjecting aromatic vinyl and unsaturated nitrile to suspension polymerization is mixed with the said ABS graft polymers. Generally, however, a resin composition prepared by mixing an ABS resin powder obtained according to emulsion polymerization with a pearl-like resin polymer cannot be brought to a homogeneous dispersed state, unless the said two resins are sufficiently kneaded by means of a kneader of high efficiency, e.g. a Banbury type kneader, and is inferior particularly in gloss and impact strength. Further, when subjected to extrusion molding, the composition gives nothing but a molded article which is large in number of so-called fish eyes. Separately, there has been proposed, in order to prepare a resin composition improved in impact strength, a process in which a power obtained by subjecting, in the presence of a major amount of a rubbery polymer latex, a minor amount of a monomer mixture of aromatic vinyl and unsaturated nitrile to emulsion polymerization to chemically bond more than 80% of the monomer mixture to the rubbery polymer, and coagulating the resulting polymer latex together with a resinous copolymer latex formed by subjecting in other system only the above-mentioned monomer mixture to emulsion polymerization, is blended with a pearl-like aromatic vinyl-unsaturated nitrile copolymer obtained according to suspension polymerization. This process, however, is not economically advantageous because of its being complex in production steps.

As the result of various studies on the drawbacks of the above-mentioned conventional processes, the present inventors have found a resin composition excellent in mechanical properties, appearance and moldability.

The present invention provides a thermoplastic resin composition comprising (I) 20 to 70 parts by weight of a copolymer consisting of 20 to 50 parts by weight of a diene type rubbery polymer having a gel content of at least 75% and an average particle diameter of at least $0.2\mu$ and a resinous polymer consisting of 40 to 60 parts by weight of an aromatic vinyl compound and 10 to 30 parts by weight of an unsaturated aliphatic nitrile compound the proportion of said resinous polymer chemically bonded to the above-mentioned rubbery polymer (hereinafter referred to as degree of graft) being 15 to 50 parts by weight per 100 parts by weight of the rubbery polymer, the specific viscosity of the remaining unbonded resinous polymer being 0.5 to 0.9, (II) 30 to 80 parts by weight of a polymer having a specific viscosity of 0.45 to 0.9 which comprises 65 to 85 parts by weight of an aromatic vinyl compound and 35 to 15 parts by weight of an unsaturated aliphatic nitrile compound, (III) 0.1 to 3 parts by weight of a metal salt of a fatty acid and (IV) at least 0.01 part by weight of an organosilicon compound. Even when this composition is merely subjected to simple melt-extrusion, the resin composition gives a molded article which is entirely free from the above-mentioned drawbacks.

A principal advantage attained by the present invention is that the ABS graft polymer can sufficiently display excellent mechanical strengths even when incorporated with other resin, and a subsidiary advantage is that the amount of the organosilicon compound, which is expensive, in general, can be made smaller by use of a fatty acid metallic soap in combination therewith.

The rubbery polymer used in the present invention include, for example, polybutadienes and copolymers composed of at least 75% of butadiene and a monomer copolymerizable therewith to form a rubbery polymer. Examples of said monomer include aromatic vinyls represented by styrene and α-methylstyrene; unsaturated acrylates and methacrylates represented by methyl acrylate and methyl methacrylate; and divinylbenzene. The rubbery polymer should have a gel content of at least 75% and an average particle diameter of at least $0.2\mu$. In order to obtain a molded article excellent in impact strength, and appearance, the rubbery polymer should have been dispersed uniformly and stably in the resin composition. Particularly in the case where the degree of graft is desired to be controlled to such a relatively low value as about 15 to 50% for such a necessity as mentioned later, the gel content of the rubbery polymer should be more than 75%, preferably 80 to 90%. Further, the particle diameter of the rubbery polymer is also a factor which gives influence to the moldability of the resin composition and the appearance of the final molded article. If the particle diameter is less than 0.2μ, the above-mentioned moldability and appearance are greatly deteriorated. The amount of the rubbery polymer used is desirably 20 to 50 parts per 100 parts of the total amount of said rubbery polymer and the monomers used. If the amount thereof is less than 20 parts, when the rubbery polymer is blended with an aromatic vinyl-unsaturated nitrile copolymer, the mixture is deteriorated in properties as a so-called ABS resin and is deprived of various characteristics possessed by an ABS graft polymer. On the other hand, if the amount is more than 50 parts, even when the rubbery polymer is blended with the blend polymer, the mixture scarcely gives a molded article excellent in appearance, unless such a high efficiency kneader as mentioned previously is used.

The monomers used in the emulsion graft polymerization in the presence of the rubbery polymer latex are the aforesaid aromatic vinyl and unsaturated nitrile. These monomers are used in the form of a mixture comprising 65 to 80 parts by weight of aromatic vinyl and 35 to 20 parts by weight of unsaturated nitrile. If the amount of unsaturated nitrile is larger than 35 parts, the resulting resin composition is not only increased in degree of coloration, which is further enhanced at the time of hot molding, but also lowered in fluidity at the time of molding. On the other hand, if the amount of unsaturated nitrile is less than 20 parts, the resulting resin composition is deteriorated in mechanical strength and chemical resistance.

The emulsion graft polymerization is carried out by use of a redox initiator comprising an organic peroxide and an iron salt. As the organic peroxide, there is used cumene hydroperoxide, diisopropylbenzene hydroperoxide or p-menthane hydroperoxide. The iron salt may be any of a ferrous or ferric salt, and a sulfuric or hydrochloric acid salt is used, in general. The amount of the organic peroxide is 0.1 to 1.0 part by weight and the amount of the iron salt is 0.001 to 0.1 part by weight per 100 parts by weight of polymerizable components.

The emulsifier may be any of those which are used in ordinary emusion polymerization. Generally, however, a sodium or potassium salt of disproportionated or hydrogenated rosin acid is used. In addition thereto, a fatty acid salt having 8 to 18 carbon atoms may also be used.

If necessary, the emulsion polymerization is carried out in the presence of a polymerization modifier. As the polymerization modifier, a mercapto compound is preferable. Ordinarily, there is used a long chain mercaptan such as n- or tert-dodecylmercaptan, particularly tert-dodecylmercaptan. The amount of the polymerization modifier is adequately about 0.1 to 1.0 part by weight.

The polymerization of the above-mentioned components which take part in the reaction is effected preferably at a temperature in the range of 40° to 95° C. If the temperature is less than 40° C., the reaction difficultly progresses, while if the temperature is more than 95° C., the polymerization system becomes unstable to bring about the formation of coagulated substances.

When the above-mentioned conditions are combined together, the degree of graft of the ABS graft polymer and the molecular weight of the unbonded copolymer can be varied within wide ranges. However, in order to obtain, by blending with the blend polymer, a resin composition excellent in moldability and appearance, the graft copolymer used in the present invention should have a degree of graft of 15 to 50%, preferably 20 to 40%. In case a graft polymer having a degree of graft out of the above-mentioned range, e.g. a degree of graft of less than 15%, is used, the rubbery polymer particles in the finally obtained resin composition are low in dispersion stability and, when the composition is subjected to molding at a relatively high temperature, the rubbery polymer particles agglomerate one another to give a molded article which is extremely inferior in surface gloss. Conversely, if the degree of graft is more than 50%, the homogeneous blending of the graft polymer with the blend polymer becomes difficult, so that not only no molded article excellent in appearance can be obtained but also degradation in processability and surface hardness is brought about.

The specific viscosity of the unbonded copolymer formed in the emulsion graft polymerization should be in the range of 0.5 to 0.9. If the specific viscosity is less than 0.5, the final molded article is greatly deteriorated in mechanical strength, while if the specific viscosity is more than 0.9, the degradation in molding fluidity (moldability) becomes marked.

A latex of a polymer obtained by emulsion polymerization, which satisfies all such conditions as mentioned above, is coagulated by use of an acid according to an ordinary procedure, washed and then dried to obtain a powder.

The monomers used in the preparation of blend polymer may be the same aromatic vinyl and unsaturated nitrile as mentioned previously, and are in the form of a mixture comprising 65 to 85 parts, preferably 70 to 80 parts, by weight of aromatic vinyl and 35 to 15 parts, preferably 30 to 20 parts, by weight of unsaturated nitrile. The specific viscosity of the blend polymer should be 0.45 to 0.9. If the specific viscosity is less than 0.45, a large number of fish eyes are formed, while if the specific viscosity is more than 0.9, the final resin composition is lowered in fluidity. The blend polymer may be prepared by a known suspension or emulsion polymerization method.

For injection molding, it is generally desirable to combine a free copolymer formed in the emulsion graft polymerization having a specific viscosity of 0.5 to 0.7 and a blend polymer having a specific viscosity of 0.45 to 0.7. For extrusion molding, it is desirable to combine an unbonded copolymer and a blend polymer both of which having a specific viscosity of 0.7 to 0.9.

The relation in specific viscosity between the blend polymer and the unbonded copolymer formed in the graft polymerization is such that in case the amount of the blend polymer is larger than that of the unbonded copolymer, it is desirable that the two polymers are combined together so that the specific viscosity of the blend polymer becomes greater than that of the unbonded copolymer.

In the present invention, a metallic soap of fatty acid and an organosilicon compound are used in addition to the above-mentioned 2 kinds of polymers. The addition of these compounds characteristically give such effect that the impact resistance, which is essentially possessed by the resin composition due to the aforesaid amount of the rubbery polymer contained in the resin composition, can be displayed to a greatest extent.

The metallic soap of fatty acid used in the present invention is a metal salt of a straight-chain saturated fatty acid having at least 12 carbon atoms such as, for example, lauric, palmitic or stearic acid, and the metal may be any member selected from the group consisting of alkaline earth metals such as magnesium, calcium, strontium and barium; Group IIb metals such as zinc and cadmium; Group IIIb metals such as aluminum, gallium and indium; and Group IVb metals such as germanium; tin and lead. This metallic soap is used in an amount of 0.1 to 3.0 parts by weight (hereinafter abbreviated to "phr."), preferably 0.1 to 2.0 phr., per 100 parts by weight of the total amount of the emulsified graft polymer and the blend polymer. The fatty acid metallic soap may be used either singly or in the form of a mixture comprising 2 or more of such metallic soaps.

The organosilicon compound used in the present invention is an organo polysiloxane represented by the formula,

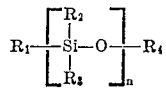

(wherein $R_1$ to $R_4$ are lower alkyl groups or aryl groups, and $n$ is a positive value of at least one), a silane compound represented by the formula, $$R_1R_2R_3R_4Si$$

(wherein $R_1$ to $R_4$ are lower alkyl groups or aryl groups), or an organohalosilane represented by the formula, $$R_{4-n}SiX_n$$

(wherein R is a lower alkyl group or an aryl group, X is a halogen atom, and $n$ is 1 to 3).

Concrete examples of the organosilicon compound include organopolysiloxanes such as polydimethylsiloxane, polymethylethylsiloxane, polydiethylsiloxane and polymethylphenylsiloxane; silanes such as tetraethylsilane and trimethylhexylsilane; and halosilanes such as triethylchlorosilane, diethyldichlorosilane, phenyltrichlorosilane and diphenyldichlorosilane.

These organosilicon compounds should have a boiling point of at least 120° C. and should be thermally and chemically stable at molding temperatures of resin compositions. Examples of organosilicon compounds capable of satisfying these conditions are, in the case of polysiloxanes, for example, those which have a viscosity of 0.2 to 500,000 centistokes, preferably 5 to 50,000 centistokes (hereinafter abbreviated to "cs."). The above-mentioned organosilicon compounds may be used either singly or in combination of 2 or more. The amount of the organosilicon compound should be at least 0.01 phr. based on the total amount of the graft copolymer and the blend polymer.

The ABS graft polymer may be mixed with the blend polymer by means of, for example, a tumbler, Henschel, Banbury or Nauter mixer, and the resulting mixture may be extruded together with the organosilicon compound and the metal soap of fatty acid.

In this mixing step or in other step, it is, of course, possible to add stabilizers, lubricants, colorants, etc.

The degree of graft referred to in the present invention was measured in the following manner:

An emulsified graft polymer latex was added to isopropyl alcohol at normal temperature. The resulting mixture was heated to 80° C. to coagulate the polymer, which was then recovered by filtration, washed and dried to obtain a graft polymer powder. A definite amount (A) of this powder was charged into acetone and then heated to completely dissolve the unbonded resinous copolymer. The thus formed solution was subjected to a centrifugal separator rotating at 15,000 r.p.m. to obtain an insoluble substance (B), and the degree of graft was calculated according to the following equation:

Degree of graft
$$= \frac{B - A \times \text{Rubber fraction in graft polymer}}{A \times \text{Rubber fraction in graft polymer}} \times 100$$

The term "specific viscosity" used herein and claims concerning each of the blend polymer and the unbonded aromatic vinyl-unsaturated nitrile copolymer in the graft polymer refers to a value measured in a 0.1% dimethylformamide solution at 25° C.

The present invention is illustrated in further detail below with reference to examples, in which all parts and percentages are by weight.

EXAMPLES 1-2

(Prescription 1)

| | Part |
|---|---|
| Cumene hydroperoxide | 0.3 |
| Ferrous sulfate | 0.005 |
| Dextrose | 1.0 |
| Sodium pyrophosphate | 0.5 |
| tert-Dodecylmercaptan | 0.4 |
| Potassium salt of disproportionated rosin | 2.0 |
| Sodium methylenebisnaphthalenesulfonate | 0.15 |
| Water | 160.0 |

A mixture comprising the components of the above prescription was charged into a polymerization vessel. To the mixture were further added 20 to 70 parts of a polybutadiene (FRS-2004, average particle diameter 0.2 to 0.3μ, gel content 85%; produced by Firestone Co.) and 80 to 30 parts of a 7:3 mixture of styrene (St) and acrylonitrile (AN). After flushing the vessel with nitrogen, the mixture was polymerized with stirring at 50° C. for 2 hours. The resulting latex was coagulated by addition of sulfuric acid, washed with water and then dried to obtain a powder having an average particle diameter of 300 to 400μ.

(Prescription 2)

| | Parts |
|---|---|
| St | 71 |
| AN | 29 |
| Dilauroyl peroxide | 0.6 |
| Potassium methacrylate - methacrylate copolymer | 0.1 |
| Manganese sulfate | 0.15 |
| Sodium chloride | 0.37 |
| Water | 100.0 |

A mixture comprising the components of the above prescription was charged into a polymerization vessel. After flushing the vessel with nitrogen, the mixture was polymerized at 80° C. for 6 hours. The resulting polymer was washed with water and then dried to obtain a pearl-like polymer powder having an average particle diameter of 300μ. The specific viscosity of this polymer was 0.62.

The graft polymer and the pearl-like polymer were mixed each other in such proportions that the amount of the rubber component in the mixed resin became 15%. The mixed resin was mixed by means of a Henschel type mixer with 1.0 phr. of barium stearate and 0.03 phr. of polydimethylsiloxane (viscosity 10 cs.) and then pelletized by means of an extruder. The resulting pellets were injection-molded or extrusion-molded to obtain test pieces, which were then subjected to measure such properties as impact strength, surface gloss, etc.

For comparison, the same tests were effected with respect to the cases where the amount of the rubbery polymer component in the graft polymer was larger (Comparative Examples 1 and 2).

The results obtained were as set forth in Table 1.

TABLE 1

| | Example | | Comparative Example | |
|---|---|---|---|---|
| | 1 | 2 | 1 | 2 |
| Polybutadiene content in graft polymer, percent | 20 | 40 | 60 | 70 |
| Degree of graft | 31 | 26 | 20 | 18 |
| Specific viscosity of free copolymer | 0.66 | 0.64 | 0.62 | 0.61 |
| Impact strength of injection plate (notched) (kg.cm./cm.²) | 25 | 26 | 22 | 18 |
| Gloss of injection plate | 90 | 91 | 80 | 55 |
| Fish eyes of extrusion sheet (visual observation) | None | None | Some | Numerous |

EXAMPLES 3-4

Graft polymers different in degree of graft were prepared by use of 30 parts of a polybutadiene (FRS-2004), 49.7 parts of St and 20.3 parts of AN. Each of the graft polymers was mixed with the same pearl-like polymer as in Example 1 so that the polybutadiene content became 15%. This mixture was mixed by means of a Henschel type mixer with 0.8 phr. of magnesium stearate and 0.04 phr. of polydimethylsiloxane (viscosity 1,000 cs.), and then pelletized by means of an extruder. The resulting pellets were subjected to tests to measure various properties.

For comparison, the same tests were effected with respect to the cases where the degree of graft was lower and higher (Comparative Examples 3 and 4).

The results obtained were as set forth in Table 2.

TABLE 2

| | Comparative Example 3 | Example 3 | Example 4 | Comparative Example 4 |
|---|---|---|---|---|
| Degree of graft of graft polymer | 12 | 20 | 33 | 60 |
| Specific viscosity of unbonded copolymer | 0.62 | 0.64 | 0.60 | 0.61 |
| Fluidity [1] ($\times 10^3$ cm.$^3$/sec.) | 16 | 15 | 16 | 10 |
| Impact strength of injection plate notched (kg. cm./cm.$^2$) | 23 | 26 | 25 | 20 |
| Gloss of injection plate | 70 | 92 | 93 | 85 |
| Rockwell hardness (R scale) (injection plate) | 108 | 107 | 107 | 102 |

[1] The fluidity was measured by use of a Koka type flow tester and represented by a value at 200° C. under a load of 30 kg., using a nozzle of 1 mm. φ x 2 mm. (the same shall apply hereinafter).

EXAMPLES 5–15

Graft polymers (degree of graft 25 to 35) different in specific viscosity of free AN-St resin were prepared in the same manner as in Example 3. One the other hand, pearl-like AN-St polymers different in specific vicosity were prepared in the same manner as in Example 1 by varying the amount of tert-dodecylmercaptan. The two polymers were mixed with each other in such proportions that the amount of the polybutadiene in the mixed resin became 15%. The mixed resin was mixed with 1.0 phr. of zinc stearate and 0.05 phr. of polymethylphenylsiloxane (viscosity 1,000 cs.), and then pelletized by means of an extruder. The resulting pellets were formed into test pieces, which were then subjected to tests to measure various properties.

For comparison, the same tests were effected with respect to the cases where the specific viscosity of the pearl-like polymer was varied (Comparative Examples).

The results obtained were as set forth in Table 3.

TABLE 3

| | Specific viscosity of unbonded AN-St polymer | Specific viscosity of pearl-like polymer | Impact strength of injection plate (notched) (kg. cm./cm.$^2$) | Fluidity ($\times 10^3$ cm.$^3$/sec.) | Fish eyes of extrusion sheet | Gloss of extruded plate |
|---|---|---|---|---|---|---|
| Comparative Example 5 | 0.51 | 0.42 | 12 | 40 | Slight | Slightly poor. |
| Example 5 | | 0.47 | 20 | 28 | None | Good. |
| Example 6 | | 0.64 | 25 | 18 | do | Do. |
| Example 7 | | 0.81 | 26 | 10 | do | Do. |
| Comparative Example 6 | | 1.05 | 26 | 5 | Numerous | Poor. |
| Comparative Example 7 | 0.62 | 0.42 | 15 | 35 | Numerous | Poor. |
| Example 8 | | 0.47 | 23 | 25 | None | Good. |
| Example 9 | | 0.64 | 26 | 15 | do | Do. |
| Example 10 | | 0.81 | 27 | 7 | do | Do. |
| Comparative Example 8 | | 1.05 | 27 | 4 | Slight | Poor. |
| Comparative Example 9 | 0.69 | 0.42 | 16 | 30 | Numerous | Poor. |
| Example 11 | | 0.47 | 24 | 23 | None | Good. |
| Example 12 | | 0.64 | 28 | 13 | do | Do. |
| Example 13 | | 0.81 | 28 | 6 | do | Do. |
| Comparative Example 10 | | 1.05 | 28 | 3 | Slight | Poor. |
| Comparative Example 11 | 0.78 | 0.42 | 16 | 22 | Innumerable | Poor. |
| Example 14 | | 0.64 | 28 | 10 | None | Good. |
| Example 15 | | 0.81 | 29 | 4 | do | Do. |
| Comparative Example 12 | | 1.05 | 29 | 2 | Slight | Slightly poor. |
| Comparative Example 13 | 1.0 | 0.42 | 16 | 15 | Innumerable | Poor. |
| Comparative Example 14 | | 0.64 | 28 | 8 | Numerous | Do. |
| Comparative Example 15 | | 1.05 | 29 | 1 | None | Good. |

EXAMPLES 16–18

According to the same prescription as in Example 1, a mixture of 49 parts of St and 21 parts of AN was emulsion-polymerized in the presence of 30 parts of a polybutadiene (FRS-2004) to obtain a graft polymer having a degree of graft of 25 and containing an unbonded AN-St polymer having a specific viscosity of 0.63. On the other hand, a pearl-like AN-St polymer having a specific viscosity of 0.61 was prepared according to the same prescription as in Example 1. To a 1:1 mixture of the thus prepared polymers were added such additives as shown in Table 4, and the resulting composition was measured in impact strength.

The results obtained were as set forth in Table 4.

TABLE 4

| Additive | Example 16 | Example 17 | Example 18 | Comp. 16 | Comp. 17 | Comp. 18 | Comp. 19 | Comp. 20 | Comp. 21 | Comp. 22 |
|---|---|---|---|---|---|---|---|---|---|---|
| Parts per hundred parts of resin: | | | | | | | | | | |
| Barium stearate | 0.5 | | | | 1.0 | 2.0 | | | | |
| Magnesium stearate | | 0.1 | | | | | | | | |
| Calcium palmitate | | | 0.1 | | | | | | | |
| Polydimethylsiloxane (10 cs.) | 0.02 | | | | | | 0.2 | 0.5 | | 0.2 |
| Polydimethylsiloxane (1,000 cs.) | | 0.04 | | | | | | | | |
| Polymethylphenylsiloxane (1,000 cs.) | | | 0.05 | | | | | | | |
| Microcrystalline wax | | | | | | | | | 1.0 | 1.0 |
| Impact strength | 27 | 28 | 26 | 6 | 15 | 20 | 18 | 18 | 8 | 17 |

What is claimed is:

1. A thermoplastic resin composition which is an acrylonitrile-butadiene-styrene graft copolymer comprising (I) 20 to 70 parts by weight of a copolymer consist-in of 20 to 50 parts by weight of a polybutadiene polymer selected from the group consisting of polybutadiene and copolymers of at least 75% butadiene and monomers copolymerizable therewith to form a rubbery polymer, said polybutadiene polymer having a gel content of at least 75% and an average particle diameter of at least 0.2μ, and a resinous polymer consisting of 40 to 60 parts by weight of an aromatic vinyl compound and 10 to 30 parts by weight of an unsaturated aliphatic nitrile compound, the proportion of said resinous polymer grafted onto the above-mentioned rubbery polymer being 15 to 50 parts by weight per 100 parts by weight of the rubbery polymer, the specific viscosity of the remaining unbonded resinous polymer being 0.5 to 0.9, (II) 30 to 80 parts by weight of a polymer having a specific viscosity of 0.45 to 0.9 which comprises 65 to 85 parts by weight of an aromatic vinyl compound and 35 to 15 parts by weight of an unsaturated aliphatic nitrile compound, said polymer (II) being blended with the component (I), (III) 0.1 to 3 parts by weight of a metal salt of a straight-chain saturated fatty acid having at least 12 carbon atoms, and (IV) at least 0.01 part by weight of an organosilicon compound selected from the group consisting of an organopolysiloxane of the formula

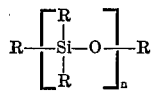

a silane of the formula

RRRRSi and an organohalosilane represented by the formula, $R_{4-m}SiX_m$ wherein each R is independently a lower alkyl group of up to 6 carbon atoms or an aryl group, X is a halogen atom, $n$ is 1 to 3 and $m$ is a positive integer.

2. A thermoplastic resin composition according to claim 1, wherein the diene type rubbery polymer is polybutadiene or styrene-butadiene rubber, the aromatic vinyl compound is styrene or α-methylstyrene, and the unsaturated aliphatic nitrile compound is acrylonitrile or methacrylonitrile.

3. A thermoplastic resin composition according to claim 1, wherein the organosilicon compound is polydimethylsiloxane, polymethylethylsiloxane, polydiethylsiloxane, polymethylphenylsiloxane, tetraethylsilane, trimethylhexylsilane, triethylchlorosilane, diethyldichlorosilane, phenyltrichlorosilane or diphenyldichlorosilane.

4. A thermoplastic resin composition according to claim 1, wherein said fatty acid metal salt is a magnesium, calcium, strontium, barium, zinc, cadmium, aluminum, gallium, indium, germanium, tin or lead salt.

5. A thermoplastic resin composition according to claim 4, wherein the fatty acid is lauric, palmitic or stearic acid.

References Cited
UNITED STATES PATENTS

| | | | |
|---|---|---|---|
| 3,121,069 | 2/1964 | Dietz | 260—23.7 X |
| 3,352,820 | 11/1967 | Bawn | 260—876 X |
| 3,442,979 | 5/1969 | Ott et al. | 260—876 X |

DONALD E. CZAJA, Primary Examiner

D. J. BARRACK, Assistant Examiner

U.S. Cl. X.R.

260—23.7 R, 23.7 N, 876 R

UNITED STATES PATENT OFFICE
CERTIFICATE OF CORRECTION

Patent No. 3,703,491      Dated November 21, 1972

Inventor(s)  YUZI TAKAYAMA ET AL

It is certified that error appears in the above-identified patent and that said Letters Patent are hereby corrected as shown below:

Claim 1, last two lines: change "n is 1 to 3 and m is a positive integer" to read --m is 1 to 3 and n is a positive integer--

Signed and sealed this 2nd day of April 1974.

(SEAL)
Attest:

EDWARD M. FLETCHER, JR.            C. MARSHALL DANN
Attesting Officer                  Commissioner of Patents